Figure 6:
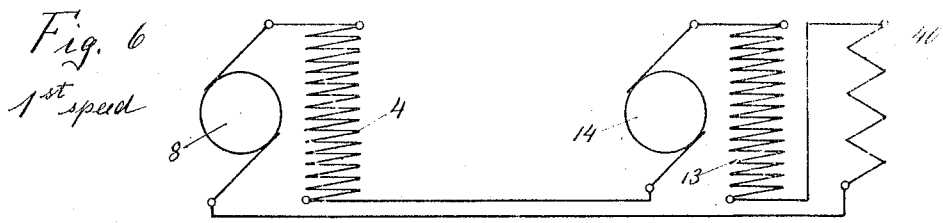

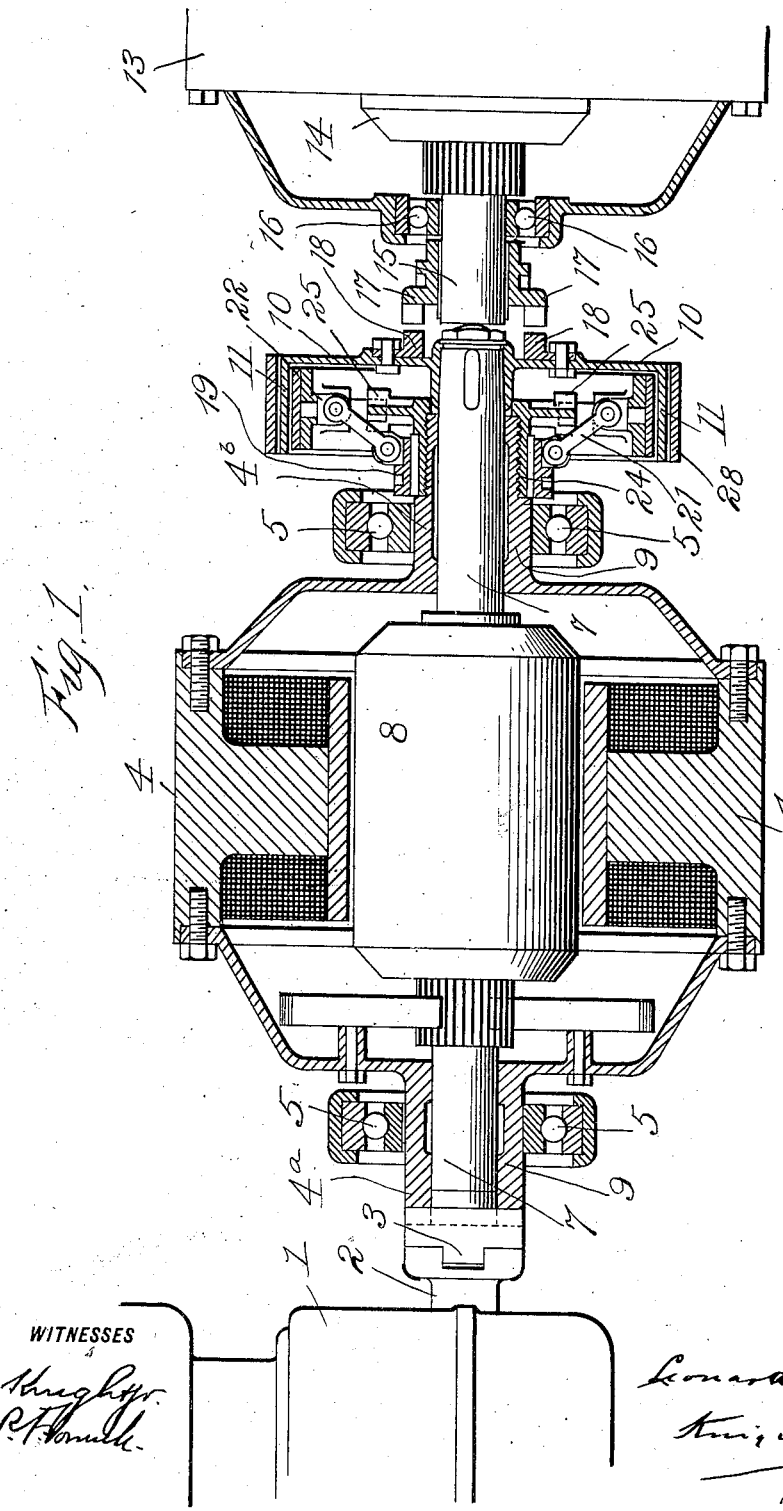

No. 895,618. PATENTED AUG. 11, 1908.
L. K. CLARK.
POWER TRANSMITTING DEVICE.
APPLICATION FILED NOV. 20, 1906.
5 SHEETS—SHEET 2.
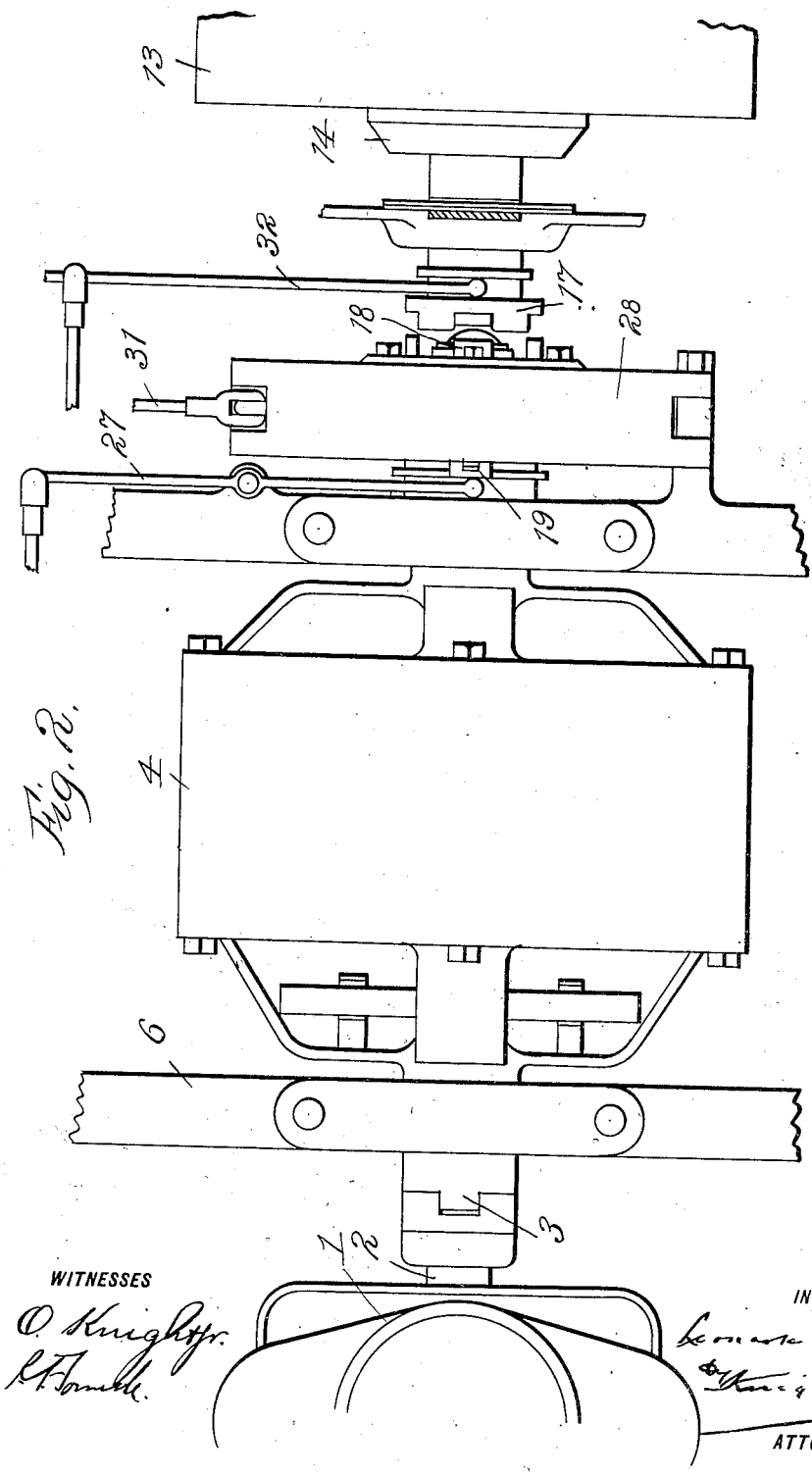
WITNESSES
INVENTOR
ATTORNEYS No. 895,618. PATENTED AUG. 11, 1908.
L. K. CLARK.
POWER TRANSMITTING DEVICE.
APPLICATION FILED NOV. 20, 1906.
5 SHEETS—SHEET 3.
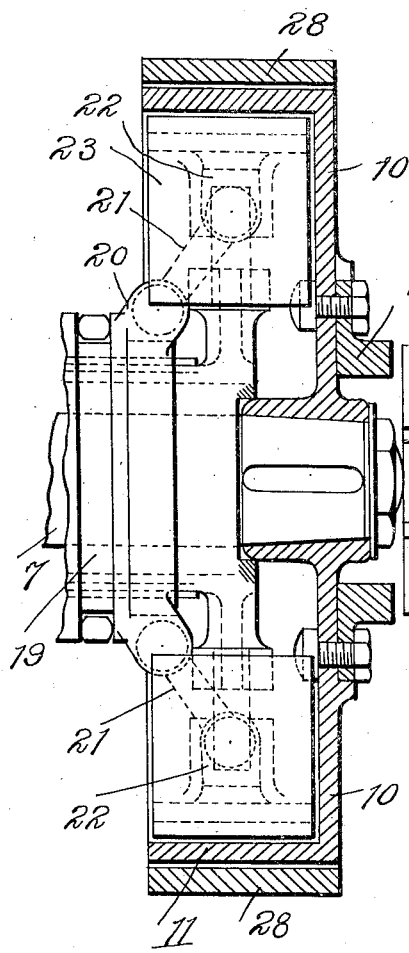
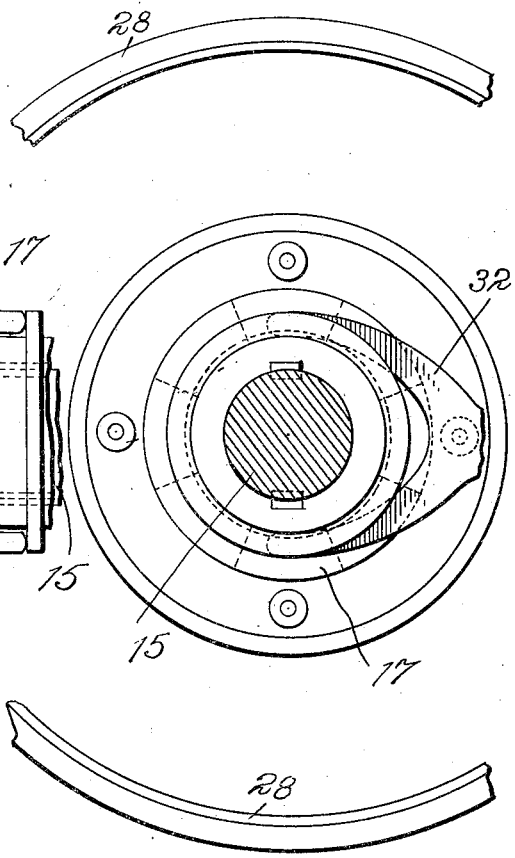
WITNESSES
INVENTOR
Leonard K. Clark
BY
ATTORNEYS

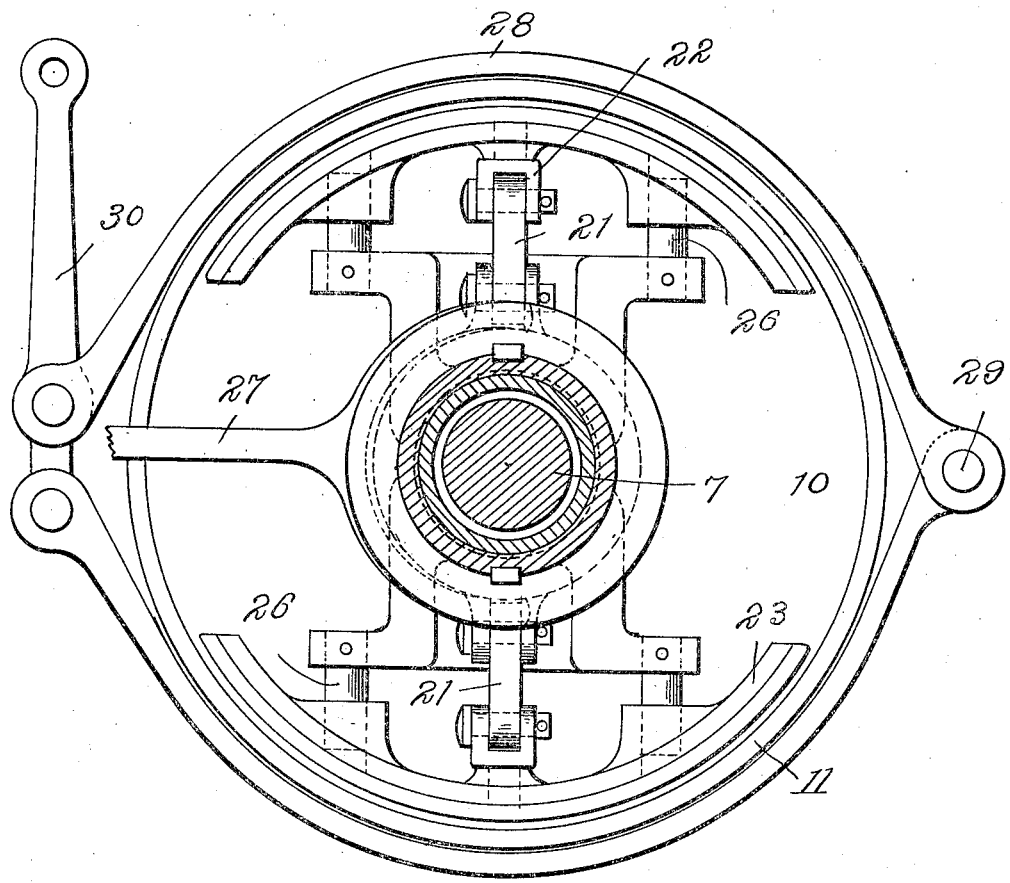

No. 895,618. PATENTED AUG. 11, 1908.
L. K. CLARK.
POWER TRANSMITTING DEVICE.
APPLICATION FILED NOV. 20, 1906.

5 SHEETS—SHEET 5.

1st speed

2nd speed

3rd speed

4th speed reverse

WITNESSES:

INVENTOR

BY

ATTORNEYS

UNITED STATES PATENT OFFICE.

LEONARD K. CLARK, OF NEW YORK, N. Y.

POWER-TRANSMITTING DEVICE.

No. 895,618.   Specification of Letters Patent.   Patented Aug. 11, 1908.

Application filed November 20, 1906. Serial No. 344,348.

*To all whom it may concern:*

Be it known that I, LEONARD K. CLARK, a citizen of the United States, and resident of the city, county, and State of New York, have invented certain new and useful Improvements in Power-Transmitting Devices, of which the following is a specification.

My invention relates to power transmitting devices and is more especially concerned with certain improvements in electro-mechanical power transmitting devices.

Electro-mechanical power transmitting devices for transmitting power with variations in the relation of speed and torque are well known. In such devices a suitable prime mover, such as a hydrocarbon engine, rotates the field structure of a generator, the armature of which is journaled in the field structure, and is dragged by the magnetism induced by the current generated in it by the relative motion between itself and the field magnets, and supplies said current to a motor armature which is fixed either on the same shaft or may be on a shaft connected with the same, the motor armature being thereby caused to rotate within a stationary field structure and turn by suitable connections, the working shaft. Such transmission has been applied to stationary work and also to moving work, such as motor vehicles, and is too well known to require more than a general description, such as above given, in this specification.

The object of my invention is to provide certain improvements in the power transmission above outlined.

My invention comprises, broadly speaking, a mechanical member by means of which the shaft of the generator may be mechanically connected with the shaft of the motor; the armature shaft of the generator may be mechanically connected with the field structure of the generator; and the armature shaft of the generator be held stationary and prevented from being dragged by the rotation of the field structure of the generator, thus acting at the same time as a brake shoe. Each of these three parts can be operated independently of the others and is at all times under the control of the person attending to the operation of the device. The combining of these functions results in certain features of the transmission which so far as I am aware are entirely novel.

For the purpose of clearly setting forth my invention, I shall describe the same with reference to a transmitting device used in connection with motor propelled vehicles, but it is to be distinctly understood that the device may be used for other kinds of work as well, and my invention is in no manner limited to its use in motor propelled vehicles.

I have shown, by way of example, in the accompanying drawings, which form a part of this specification, a specific embodiment of my invention as applied to motor propelled vehicles, and shall describe my invention with reference to said drawings.

In the drawings, Figure 1 is a sectional elevation of a power transmitting device embodying my invention, Fig. 2 is a plan of the same, Fig. 3 is a cross-section of my novel form of clutch, Fig. 4 is an elevation of the same from one side, Fig. 5 is an elevation of the same from the other side, and Figs. 6, 7, 8, 9, and 10 are diagrams illustrating the electrical connections employed in operating a motor propelled vehicle by means of my invention.

Referring now more specifically to the drawings, 1 is a prime mover which may be of any suitable nature, such as for example a hydrocarbon engine. The crank shaft 2 of this engine may be connected by a coupling 3 to the generator field magnet structure 4 for example, coupling 3 being of any well known construction. The field magnet structure 4 is mounted to rotate preferably on ball-bearings of any suitable construction, the containers of which may be rigidly connected to crossbars 6 of the chassis of the vehicle. The generator armature shaft is shown at 7 and has suitably fixed thereon the armature coils shown at 8. The armature shaft 7 is mounted in bearings 9 on the extensions $4^a$, $4^b$ of the field magnet structure 4, and the part thereof remote from the engine 1 is prolonged beyond its bearing. On the prolongation is mounted a clutch portion 10, the outer periphery of which has a flanged part 11, as shown. This flanged part 11 forms a portion of the mechanical member having the three functions above pointed out, and acts as a brake drum, the armature holder and a part of the clutch for connecting field and armature together, as hereinafter described.

The motor field magnet structure is shown at 13 and the motor armature at 14 mounted on its shaft 15 which is journaled in the field structure 13. The field magnet structure 13 of the motor is connected with the chassis of the vehicle in such position that the motor armature shaft 15, which is mounted preferably in ball-bearings 16 of any suitable construction positioned in the field magnet structure, is in alinement with a crank shaft 2 and generator armature shaft 7, above described. Splined on the end of the motor armature shaft 15 next to the generator shaft is a member 17 forming a part of a clutch, shown as a dog clutch by way of example, the other member 18 of which is bolted or otherwise suitably secured on the face of the clutch portion 10 that is next to the motor shaft. The other end of the motor armature shaft 15 is connected in any suitable manner to the axle of the vehicle (not shown in the drawings).

A sleeve or tube 24 is screwed or otherwise suitably secured on the extension 4$^b$, and splined thereon is a muff 19 that is provided with projections 20 to which are pivotally connected the links 21. The links 21 are also pivotally connected to projections 22 which are formed on clutch members 23. These clutch members 23 are arranged, as clearly shown in Figs. 3 and 4 of the drawings, within the flanged part 11 and are adapted to act on the inner face thereof when moved radially outward as hereinafter described, and thus couple together the generator field magnet structure 4 and the generator armature shaft 7, in which condition no current is generated in the armature and this part is therefore acting merely as a flywheel and the vehicle is driven mechanically by engine 1. Said sleeve or tube 24 has two parts 25 which transmit the drive from the generator field magnet structure 4 to the clutch members 23 by means of the pins 26, suitably secured in parts 25. Two of these pins 26 are carried in each part 25, and each pin enters a perforation which is in registry therewith in a clutch member 23. The pins 26 are of such length as to permit movement of the clutch members 23 without becoming disengaged from said perforations. When the muff 19 is moved to the right in Figs. 1 and 2 by means of a lever 27 under the control of the driver, the links 21 will be moved from their inclined position shown in Figs. 1 and 3 into a position in which they are approximately vertical and thus expand the clutch members 23 and cause them to move into engagement with the inner face of flanged part 11, whereby the generator field magnet structure 4 and generator armature shaft 7 are frictionally coupled as above described.

Surrounding the outer face of the flanged part 11 is a brake band 28 which acts on said outer face of flanged part 11, and has two functions, first to act as a brake for the vehicle, second, to hold the armature against rotation. The brake band 28 is formed in two parts hinged together at 29 and pivotally connected to a lever 30 which is operated through the connecting link 31 and the usual mechanism (not shown) by the driver. The clutch member 17 is also operated by the driver through suitable connections, the last member of which is shown as lever 32. In ordinary running, the clutch member 17 is in engagement with the clutch member 18. The generator armature 8 and the motor armature 14 thus rotate in unison.

The electrical connections are diagrammatically illustrated in Figs. 6 to 10 inclusive.

Figure 7:
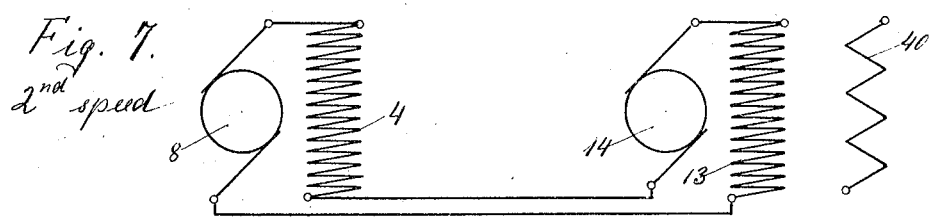
Figure 8:
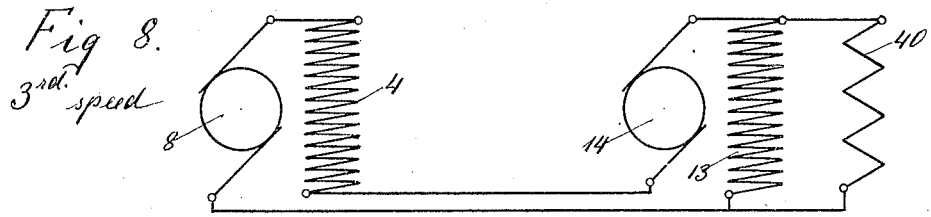
Figure 9:
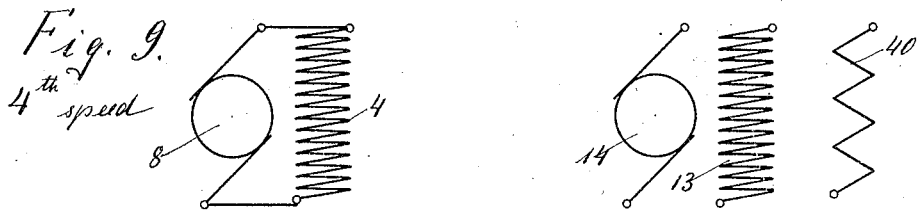

In operation, supposing the engine 1 to be running, the operator, by means of the operating lever, clutches together the two armature shafts and makes the electrical connection illustrated in Fig. 6 which is for the first speed. In this figure, the generator armature 8, generator field 4, motor armature 14, motor field 13 and the resistance 40 are all connected in series so that current generated from the generator operates the motor with the resistance 40 in series. The inertia of the vehicle retards the generator armature thus causing greater relative motion between armature and field so that a high current is generated and this being supplied to the motor gives great torque added to that from the strong magnetism in the generator armature due to such high current. For the next speed, as illustrated in Fig. 7, the resistance 40 is cut out and the two armatures and two fields are connected in closed series relation. In this case the resistance 40 being cut out reduces the resistance in the circuit and enables more current to be supplied to the motor. The third speed is illustrated in Fig. 8, and in this connection the resistance 40 is in shunt to the motor field 13 thereby diminishing the field current and increasing the current in the armature of the motor, and thus gaining additional speed. The fourth speed is illustrated in Fig. 9 where the armature and field of the generator are mechanically coupled by means of the clutch member already described and the two armature shafts coupled together, the motor being out of electrical connection with the generator and thus the vehicle is being driven directly by the engine, and the motor armature 14 acts as the flywheel.

Figure 10:
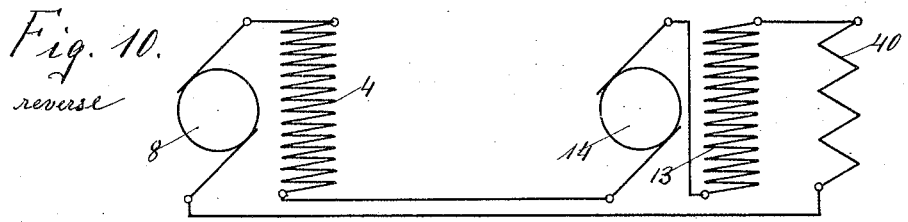

In Fig. 10 the connection for reversing is illustrated. To reverse the vehicle, the generator armature is held stationary by the brake shoe already described while the generator field is revolved so that the armature has a current generated in it which is supplied to the motor armature 14 in the same direction as in forward running but to the motor field 13 in the opposite direction, and the resistance 40 is in series. The mechanical clutch between the two armature shafts is of course open in reversing. It will thus be seen that the motor is driven by current from the generator in reversed directions, so that the reversing of the vehicle propulsion is obtained. Since the motor is now doing the entire work in propelling the vehicle, the high current produced by locking the generator armature is of especial advantage.

It should be borne in mind that generation of current by the generator produces a reactive torque between its field magnet and armature. This reactive torque is used in forward propulsion to assist the motor in driving the vehicle and in the acceleration thereof. When the watt output of the generator begins to decrease owing to the decrease in the relative motion between the field and armature of the generator, the connections illustrated in Fig. 9 are made so that the generator is short circuited, then the field and armature speeds are brought nearly equal to the current in the armature, the lever 27 of the muff 19 is then operated, bringing the clutch members 23 into contact with the flanged part 11 and thus locking the field magnet structure 4 and armature 8 together. These parts, together with the motor armature 14, the clutch members 17, 18 being in engagement thus rotate as one, and the drive from the shaft 2 of the engine 1 to the gear driving the road wheels is direct and there are thus no electrical losses. The generator field magnet structure 4, clutch portions 10, 18 and 17 and motor armature shaft 15 from the power transmitting media, and the generator field magnet structure 4, the two part clutch, etc., and the armatures 8 and 14 act as a flywheel to the engine 1.

In the reversing arrangement I prefer to hold the armature 8 stationary by the frictional clutch, but it is obvious that the disk 10 and therefore the armature 8 could just as well be held stationary positively.

Any suitable and well known form of controller may be employed for making the electrical connections. The operation of the lever 32 of the clutch member 17 may cause first the disengagement of the clutch and then the reversal of the motor connections.

Having thus described my invention, the following is what I claim as new therein and desire to secure by Letters Patent:

1. In a power transmitting device the combination with a generator having a rotary armature member and a rotary field member and a motor having a rotary armature member and a fixed field member; of means for rotating the field member of said generator and means for coupling together and uncoupling the generator armature member and the motor armature member.

2. In a power transmitting device of the character described, the combination with a generator having a rotatable field structure, a shaft journaled therein, and an armature fixed on said shaft, a motor having a stationary field structure, a shaft journaled therein and an armature fixed on said shaft; of means for clutching together the two shafts to cause the two armatures to rotate in unison, and means for clutching together the armature shaft and the rotatable field structure of the generator.

3. In a power transmitting device of the character described, the combination with a generator having a rotatable field structure, a shaft journaled therein, and an armature fixed on said shaft, a motor having a stationary field structure, a shaft journaled therein and an armature fixed on said shaft; of means for clutching together the two shafts to cause the two armatures to rotate in unison, means for clutching together the armature shaft and the rotatable field structure of the generator and means for braking the armature shaft.

4. In a power transmitting device of the character described, the combination with a generator having a rotatable field structure, an armature shaft journaled therein and an armature fixed on said shaft; of a clutch portion having a flanged part being fixed on said armature shaft, a muff splined on said rotatable field structure, suitably guided clutch members adapted to engage said flanged part, links connecting said muff with said clutch members, and means for sliding said muff on said field structure to cause said clutch members to engage the said flanged part.

LEONARD K. CLARK.

Witnesses:
J. T. DUDLEY,
O. KNIGHT, Jr.